US012698969B2

(12) United States Patent
Yan

(10) Patent No.: US 12,698,969 B2
(45) Date of Patent: Aug. 4, 2026

(54) APPARATUS AND METHODS FOR GYROSCOPE SIGNAL DEMODULATION

(71) Applicant: Analog Devices, Inc., Wilmington, MA (US)

(72) Inventor: Jeff Yan, Andover, MA (US)

(73) Assignee: Analog Devices, Inc., Wilmington, MA (US)

( * ) Notice: Subject to any disclaimer, the term of this patent is extended or adjusted under 35 U.S.C. 154(b) by 412 days.

(21) Appl. No.: 18/474,624

(22) Filed: Sep. 26, 2023

(65) Prior Publication Data

US 2025/0102301 A1     Mar. 27, 2025

(51) Int. Cl.
G01C 19/5776 (2012.01)

(52) U.S. Cl.
CPC ................................ G01C 19/5776 (2013.01)

(58) Field of Classification Search
CPC .................................................. G01C 19/5776
See application file for complete search history.

(56) References Cited

U.S. PATENT DOCUMENTS

| | | | | |
|---|---|---|---|---|
| 6,282,803 B1 * | 9/2001 | Dunne | ................... | G01C 17/38 |
| | | | | 324/253 |
| 8,638,225 B1 * | 1/2014 | Bocko | ...................... | G07C 3/00 |
| | | | | 702/159 |
| 10,177,779 B2 * | 1/2019 | Lee | ........................ | H03M 1/462 |
| 10,469,030 B2 * | 11/2019 | Nestler | .................... | H03D 7/12 |
| 10,715,096 B1 * | 7/2020 | Kraver | ................ | H03M 1/1245 |
| 2008/0197919 A1 * | 8/2008 | Prandi | ...................... | H03D 1/22 |
| | | | | 329/347 |
| 2011/0197674 A1 * | 8/2011 | Prandi | ................ | G01C 19/5762 |
| | | | | 73/504.12 |
| 2011/0283793 A1 * | 11/2011 | Itakura | ................ | G01C 19/5776 |
| | | | | 73/504.12 |
| 2013/0047727 A1 * | 2/2013 | Kim | .................... | G01C 19/5776 |
| | | | | 73/514.16 |
| 2013/0152664 A1 * | 6/2013 | Pyo | .................... | G01C 19/5776 |
| | | | | 73/1.38 |
| 2013/0160544 A1 * | 6/2013 | Hsu | ..................... | G01C 19/5776 |
| | | | | 73/504.12 |
| 2014/0190258 A1 * | 7/2014 | Donadel | ............ | G01C 19/5726 |
| | | | | 73/504.12 |
| 2015/0033821 A1 * | 2/2015 | Mangano | ............... | G01C 19/00 |
| | | | | 73/1.77 |

(Continued)

OTHER PUBLICATIONS

Kurahashi et al., "Design of Low-Voltage Highly Linear Switched-R-MOSFET-C Filters" IEEE Journal of Solid-State Circuits, vol. 42, No. 8, dated Aug. 2007 in 11 pages.

(Continued)

*Primary Examiner* — David J Bolduc
(74) *Attorney, Agent, or Firm* — Knobbe, Martens, Olson & Bear, LLP

(57) ABSTRACT

Apparatus and methods for gyroscope signal demodulation are disclosed herein. In certain embodiments, a demodulation circuit for a microelectromechanical systems (MEMS) gyroscope includes a switched resistor filter that samples a gyroscope signal received from a microelectromechanical sensor. The switched resistor filter provides sampling with a controlled duty cycle and noise bandwidth limit to achieve high signal-to-noise ratio (SNR) performance.

20 Claims, 6 Drawing Sheets

(56)        References Cited

U.S. PATENT DOCUMENTS

| | | | |
|---|---|---|---|
| 2015/0057959 A1* | 2/2015 | Ezekwe | G01C 19/5776 |
| | | | 702/96 |
| 2015/0176992 A1* | 6/2015 | Entringer | G01C 19/567 |
| | | | 73/504.12 |
| 2015/0226556 A1* | 8/2015 | Aaltonen | G01C 19/5776 |
| | | | 73/504.12 |
| 2015/0226557 A1* | 8/2015 | Aaltonen | G01C 19/5776 |
| | | | 73/504.12 |
| 2016/0161256 A1* | 6/2016 | Lee | G01C 19/5776 |
| | | | 73/504.12 |
| 2017/0191830 A1* | 7/2017 | Maeda | G01C 19/5776 |
| 2019/0129042 A1* | 5/2019 | Yanagisawa | B60G 17/019 |
| 2024/0093995 A1* | 3/2024 | Valzasina | G01C 19/5712 |

OTHER PUBLICATIONS

Watson, J., Analog Devices, Inc., "MEMS Gyroscope Provides Precision Inertial Sensing in Harsh High Temps," downloaded Aug. 2023, in 4 pages.

* cited by examiner

10

1
3
2
4a
4b
5

DIRECTION
OF ROTATION 10
11
13

APPARATUS AND METHODS FOR GYROSCOPE SIGNAL DEMODULATION

FIELD OF THE DISCLOSURE

Embodiments of the invention relate to electronics, and more particularly, to demodulation of gyroscope signals.

BACKGROUND

Gyroscopes are used for measuring angular rate by way of Coriolis acceleration. Microelectromechanical systems (MEMS) gyroscopes provide a compact form factor for enabling precision angular rate and/or rotation speed measurement even in the presence of shock and vibration. Example applications for gyroscopes include, but are not limited to, inertial sensing and navigation.

SUMMARY OF THE DISCLOSURE

Apparatus and methods for gyroscope signal demodulation are disclosed herein. In certain embodiments, a demodulation circuit for a microelectromechanical systems (MEMS) gyroscope includes a switched resistor filter that samples a gyroscope signal received from a microelectromechanical sensor. The switched resistor filter provides sampling with a controlled duty cycle and noise bandwidth limit to achieve high signal-to-noise ratio (SNR) performance.

In one aspect, a demodulation circuit for a gyroscope is provided. The demodulation circuit includes a plurality of switches configured to receive an amplitude modulated (AM) gyroscope signal, an output capacitor coupled to the plurality of switches and configured to output a demodulated gyroscope signal, and a clock duty cycle control circuit configured to control a duty cycle of the plurality of switches to control a trade-off between a settling time and a noise of the demodulated gyroscope signal.

In another aspect, a method of signal demodulation for a gyroscope is provided. The method includes receiving an amplitude modulated (AM) gyroscope signal as an input to a plurality of switches, outputting a demodulated gyroscope signal from an output capacitor coupled to the plurality of switches, and controlling a duty cycle of the plurality of switches to control a trade-off between a settling time and a noise of the demodulated gyroscope signal using a clock duty cycle control circuit.

In another aspect, a gyroscope demodulation system is provided. The gyroscope demodulation system includes a microelectromechanical sensor configured to output an amplitude modulated (AM) gyroscope signal and a demodulation circuit. The demodulation circuit includes a plurality of switches configured to receive the AM gyroscope signal, an output capacitor coupled to the plurality of switches and configured to output a demodulated gyroscope signal, and a clock duty cycle control circuit configured to control a duty cycle of the plurality of switches to control a trade-off between a settling time and a noise of the demodulated gyroscope signal.

DETAILED DESCRIPTION OF EMBODIMENTS

Figure 1A:
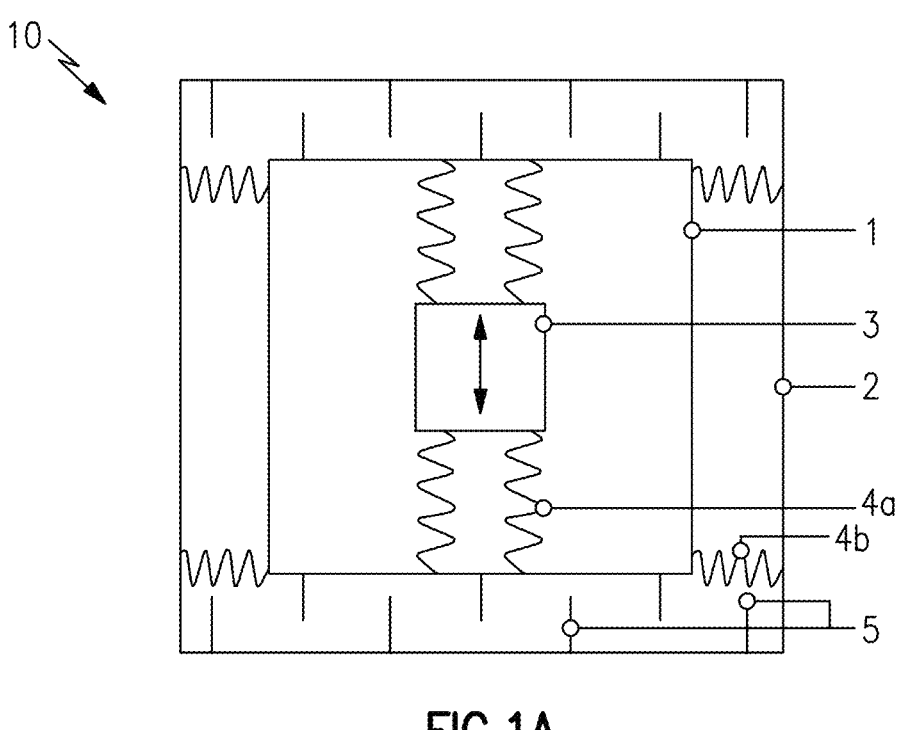
FIG. 1A is a schematic diagram of one example of a microelectromechanical sensor for a gyroscope.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A MEMS gyroscope signal is amplitude modulated (AM). Various techniques have been used to demodulate AM gyroscope signals including sinusoidal demodulation, peak detection, square wave demodulation, and sampling mixing. Although various techniques can be used for demodulation, existing techniques suffer from several drawbacks including, but not limited to, high signal-to-noise ratio (SNR), large component size, complex implementation, and/or noise aliasing.

Apparatus and methods for gyroscope signal demodulation are disclosed herein. In certain embodiments, a demodulation circuit for a MEMS gyroscope includes a switched resistor filter that samples a gyroscope signal received from the MEMS gyroscope. The switched resistor filter provides sampling with a controlled duty cycle and noise bandwidth limit to achieve high signal-to-noise ratio (SNR) performance.

For example, the teachings herein can be used to achieve SNR performance approaching that of an ideal case of sinusoidal signal demodulation with zero noise folding.

In certain implementations, the noise bandwidth limit is achieved by selection of a sufficiently large resistor-capacitor (RC) time constant to limit noise folding to a desired amount.

The demodulation circuit can include a clock duty cycle control circuit that controls a duty cycle of switch control signals provided to switches of the switched resistor filter. By controlling the duty cycle, a desired trade-off between settling time and noise can be realized.

The switched resistor filter can include switches that are connected to an output capacitor through one or more resistors. The combination of the resistors and the output capacitor acts as a low pass filter that lowers an amount of folded noise arising from demodulation.

In certain implementations, a high pass filter is further included before the switches to further reduce folded noise at the cost of additional resistor-capacitor (RC) components. Furthermore, in some implementations, an amplifier can be included before the high pass filter to provide amplification to the AM gyroscope signal.

Figure 1B:
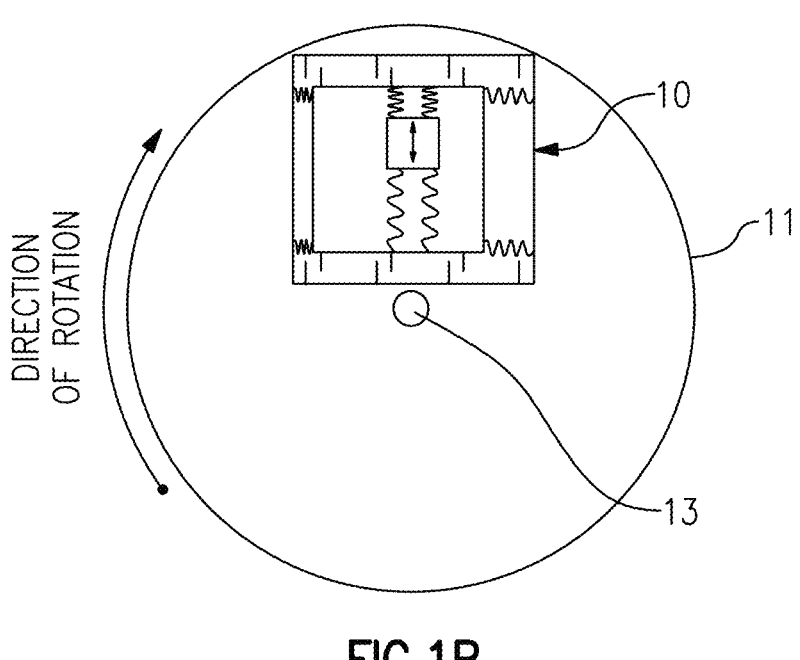
FIG. 1B is a schematic diagram of one example of the microelectromechanical sensor of FIG. 1A subject to clockwise rotation.

FIG. 1A is a schematic diagram of one example of a microelectromechanical sensor 10 for a gyroscope. FIG. 1B is a schematic diagram of one example of the microelectromechanical sensor 10 of FIG. 1A subject to clockwise rotation.

With reference to FIGS. 1A and 1B, the microelectromechanical sensor 10 includes an inner frame 1, an outer frame 2, a resonating mass 3, inner springs 4a, outer springs 4b, and sense fingers 5.

In the illustrated embodiment, the inner springs 4a couple the resonating mass 3 to the inner frame 1. Additionally, the outer springs 4b couple the inner frame 1 to the outer frame 2, which can correspond to a substrate in some implementations.

As the resonating mass 3 moves and the surface to which the gyroscope 10 is mounted rotates, the resonating mass 3 and the inner frame 1 experience Coriolis acceleration and are translated (for instance, by 90°) from the vibratory movement. Thus, as the rate of rotation increases, so does the displacement of the resonating mass 3 and the AM gyroscope signal derived from the corresponding capacitance change sensed by the sense fingers 5. In the example shown in FIG. 1B, the resonating mass 3 is displaced laterally in response to the Coriolis effect.

With reference to FIG. 1B, the gyroscope 10 can be placed anywhere on a rotating object 11 and at any angle, with the sensing axis placed parallel to the axis of rotation 13. Accordingly, the microelectromechanical sensor 10 can be employed in a wide range of applications, including those associated with inertial sensing and/or navigation.

In the illustrated embodiment, the displacement of the resonating mass 3 and the inner frame 1 is sensed through the sense fingers 5, which serve as capacitive sensing elements. In certain implementations, the inner frame 1 includes silicon beams that are each interdigitated with two sets of stationary silicon beams (serving as the sense fingers 5) and attached to the outer frame 2, which can correspond to a substrate in some examples. Thus, displacement due to angular rate induces a differential capacitance used to generate an AM gyroscope signal.

Such an AM gyroscope signal can be a very small signal since the Coriolis acceleration can produce fractions of Angstroms of beam deflection and corresponding capacitance changes on the order of zeptofarads. Thus, it is important to reduce cross sensitivity to parasitic sources such as temperature, package stress, external acceleration, and/or electrical noise, and to accurately demodulate the AM gyroscope signal to detect the correct Coriolis acceleration.

To aid in providing high accuracy, the electronics, including the demodulation circuitry, can be placed on the same die as the microelectromechanical sensor 10. Furthermore, in certain implementations, differential signaling is used to enhance noise rejection.

Figure 2A:
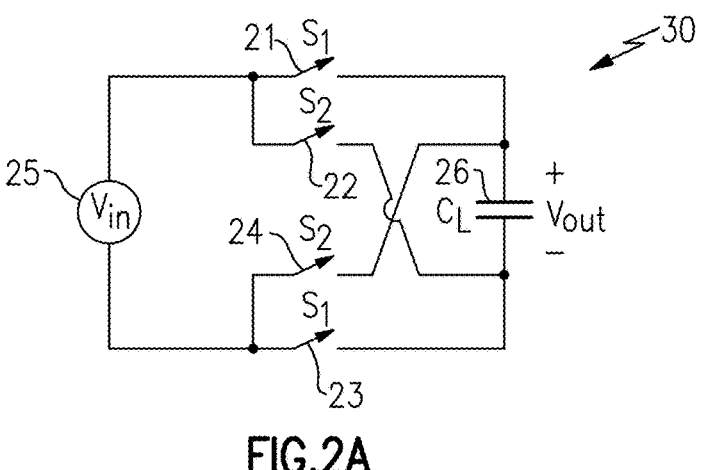
FIG. 2A is a schematic diagram of one embodiment of a demodulation circuit for a gyroscope.
Figure 2B:
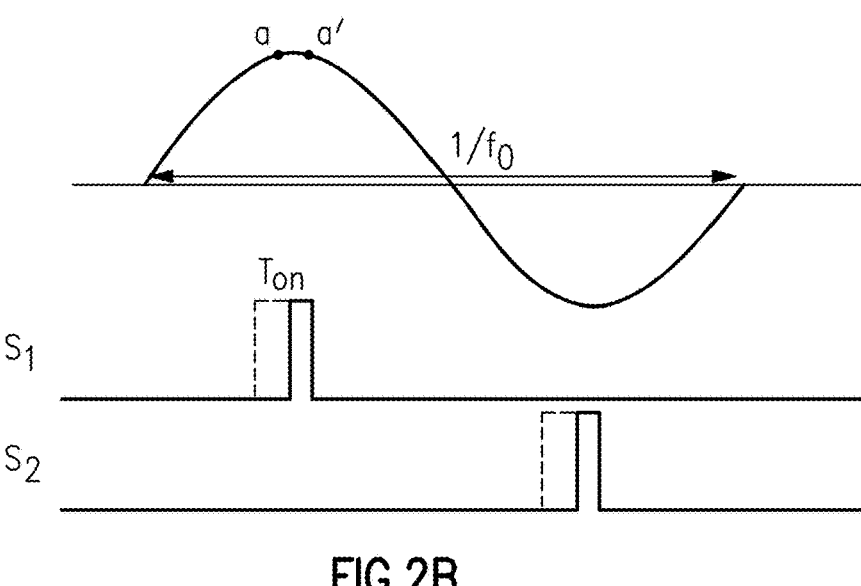
FIG. 2B is a graph of one example of switch control signal waveforms for the demodulation circuit of FIG. 2A.

FIG. 2A is a schematic diagram of one embodiment of a demodulation circuit 30 for a gyroscope. FIG. 2B is a graph of one example of switch control signal waveforms for the demodulation circuit 30 of FIG. 2A. Such switch control signal waveforms are controlled by a clock duty cycle control circuit in accordance with the teachings herein. The demodulation circuit 30 can be used to demodulate an AM gyroscope signal such as that generated by the microelectromechanical sensor 10 or another suitable gyroscope sensor.

In the illustrated embodiment, the demodulation circuit 30 includes a first switch 21, a second switch 22, a third switch 23, a fourth switch 24 that receive an AM gyroscope signal $V_{in}$ from an input voltage source 25 (which can represent a microelectromechanical sensor). The demodulation circuit 30 further includes an output capacitor 26 (with a capacitance $C_L$) on which the switches 21-24 provide the demodulated output signal $V_{out}$. Although not shown in FIG. 2A, in certain implementations the output capacitor 26 has a controllable capacitance value.

As shown in FIG. 2A, the first switch 21 is connected between a first input node (corresponding to a first terminal of the input voltage source 25, in this example) and a first terminal of the output capacitor 26 and is controlled by a first switch control signal $S_1$. Additionally, the second switch 22 is connected between the first input node and a second terminal of the output capacitor 26 and is controlled by a second switch control signal $S_2$. Furthermore, the third switch 23 is connected between a second input node (corresponding to a second terminal of the input voltage source 25, in this example) and the second terminal of the output capacitor 26 and is controlled by the first switch control signal $S_1$. Additionally, the fourth switch 24 is connected between the second input node and the first terminal of the output capacitor 26 and is controlled by the second switch signal $S_2$.

In the illustrated embodiment, a duty cycle of the first switch control signal $S_1$ and of the second switch control signal $S_2$ are controlled to sample the AM gyroscope signal $V_{in}$ over an on period ($T_{on}$) of the switches that is small compared to the signal period ($T_0 = 1/f_0$) of the AM gyroscope signal $V_{in}$.

For example, when $T_{on}$ is large, the switches 21-24 behave like mixers. However, as $T_{on}$ approaches 0, the switches 21-24 behave like sampling switches that provide a signal sample to the output capacitor 26. The smaller the $T_{on}$ the more signal is provided, but more noise is provided as well. Thus, $T_{on}$ acts like a cut-off frequency.

Accordingly, the duty cycle ($d = T_{on}/T_0$) of the switches can be controlled to achieve a desired trade-off between settling time and noise.

Figure 2C:
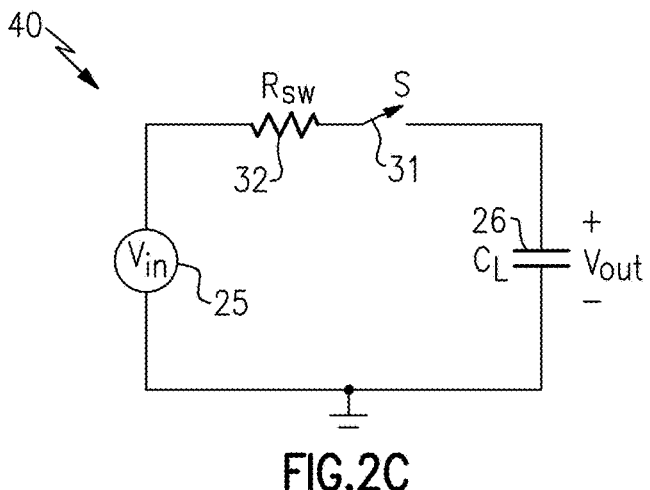
FIG. 2C is a schematic diagram of one example of a resistance-capacitance (RC) model for the demodulation circuit of FIG. 2A.

FIG. 2C is a schematic diagram of one example of a resistance-capacitance (RC) model for the demodulation circuit 30 of FIG. 2A. In FIG. 2C, the switches 21-24 are represented by a switch resistor 32 (with resistance $R_{sw}$) in series with an ideal switching element 31 controlled by a switch control signal S.

Figure 2D:
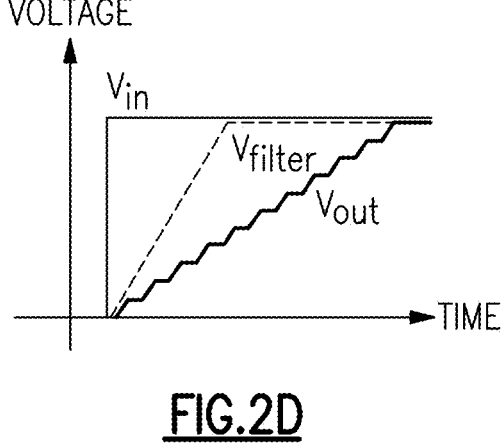
FIG. 2D is a graph of one example of plots of voltage versus time for the demodulation circuit of FIG. 2A.

FIG. 2D is a graph of one example of plots of voltage versus time for the demodulation circuit of FIG. 2A. In FIG. 2D, the output signal $V_{out}$ in response to an input step voltage is depicted. A plot of an ideal filter voltage $V_{filter}$ is also shown. As shown in FIG. 2D, $T_{on}$ acts like a cut-off frequency for filtering.

Figure 2E:
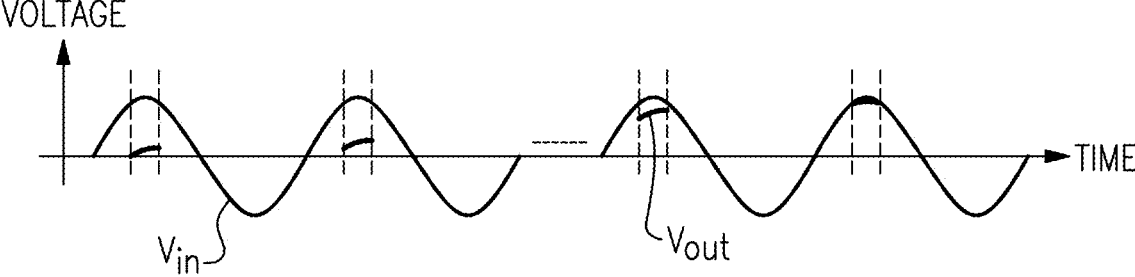
FIG. 2E is a graph of one example of output voltage versus time across multiple cycles of the demodulation circuit of FIG. 2A.

FIG. 2E is a graph of one example of output voltage versus time across multiple cycles of the demodulation circuit 30 of FIG. 2A. As shown in FIG. 2E, the voltage of the output signal $V_{out}$ gradually builds over time, with averaging of samples within $T_{on}$ occurring on each cycle.

Figure 3A:
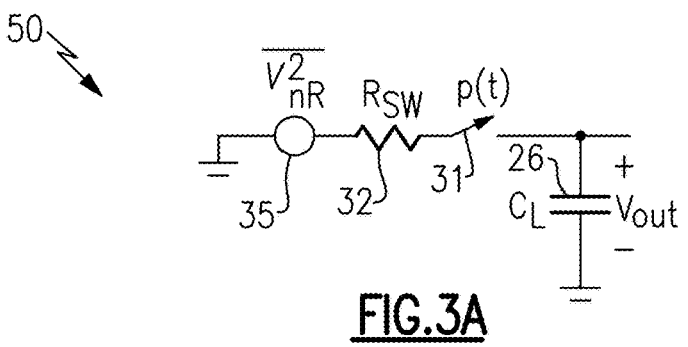
FIG. 3A is a schematic diagram of one embodiment of a noise circuit model for the demodulation circuit of FIG. 2A.
Figure 3B:
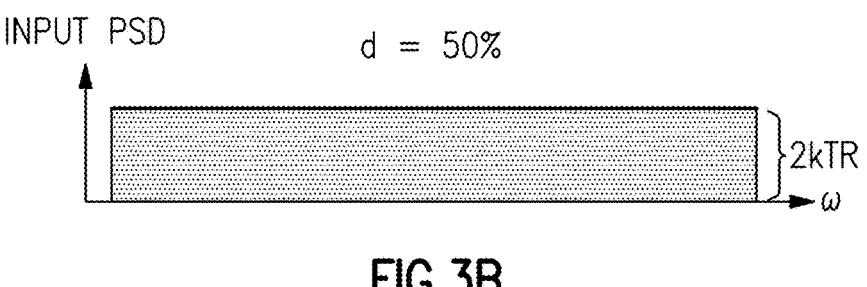
FIG. 3B is a graph of one example of input power spectral density (PSD) for the noise circuit model of FIG. 3A.
Figure 3C:
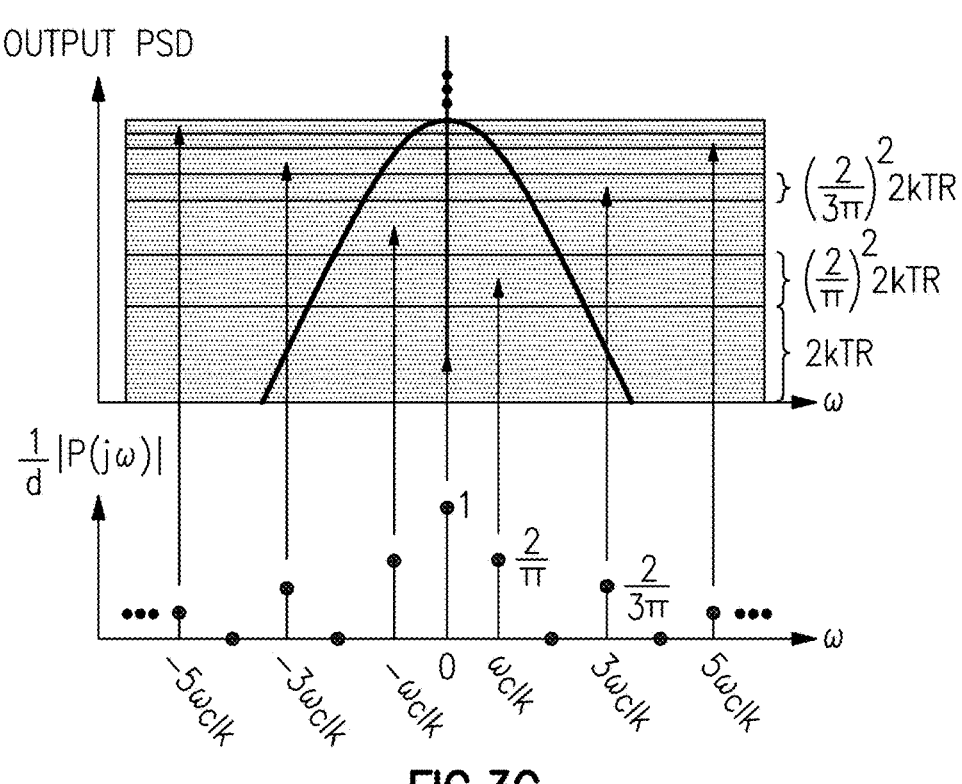
FIG. 3C is a graph of one example of output PSD for the noise circuit model of FIG. 3A.

FIG. 3A is a schematic diagram of one embodiment of a noise circuit model 50 for the demodulation circuit 30 of FIG. 2A. FIG. 3B is a graph of one example of input power spectral density (PSD) for the noise circuit model 50 of FIG. 3A. FIG. 3C is a graph of one example of output PSD for the noise circuit model 50 of FIG. 3A.

With reference to FIGS. 3A-3C, the noise circuit model 50 includes a noise voltage source 35, a switch resistor 32, a switch 31, and an output capacitor 26. Noise folding occurs first, with filtering followed.

In the illustrated embodiment, low frequency signal noise is up by 1/d, and roll off starts at a corner frequency $f_{3db2}=d/(2\pi R_{sw}C_L)$. Additionally, the noise aliasing factor (N.A.F.) is about $$\frac{\pi^2}{4}\frac{d}{\sin^2(d\cdot\pi)},$$

which approaches that of an ideal case of sinusoidal signal demodulation with zero noise folding.

Figure 4A:
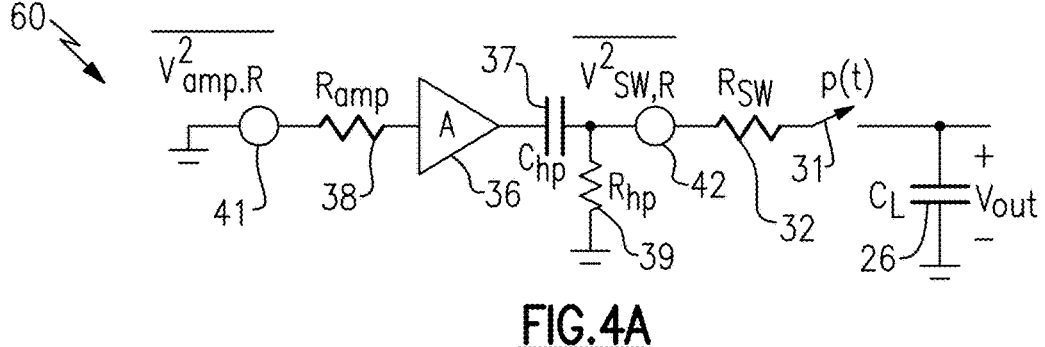
FIG. 4A is a schematic diagram of another embodiment of a noise circuit model for a demodulation circuit for a gyroscope.
Figure 4B:
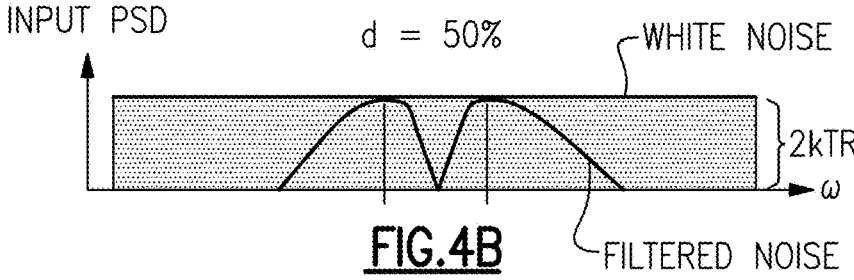
FIG. 4B is a graph of one example of input PSD for the noise circuit model of FIG. 4A.
Figure 4C:
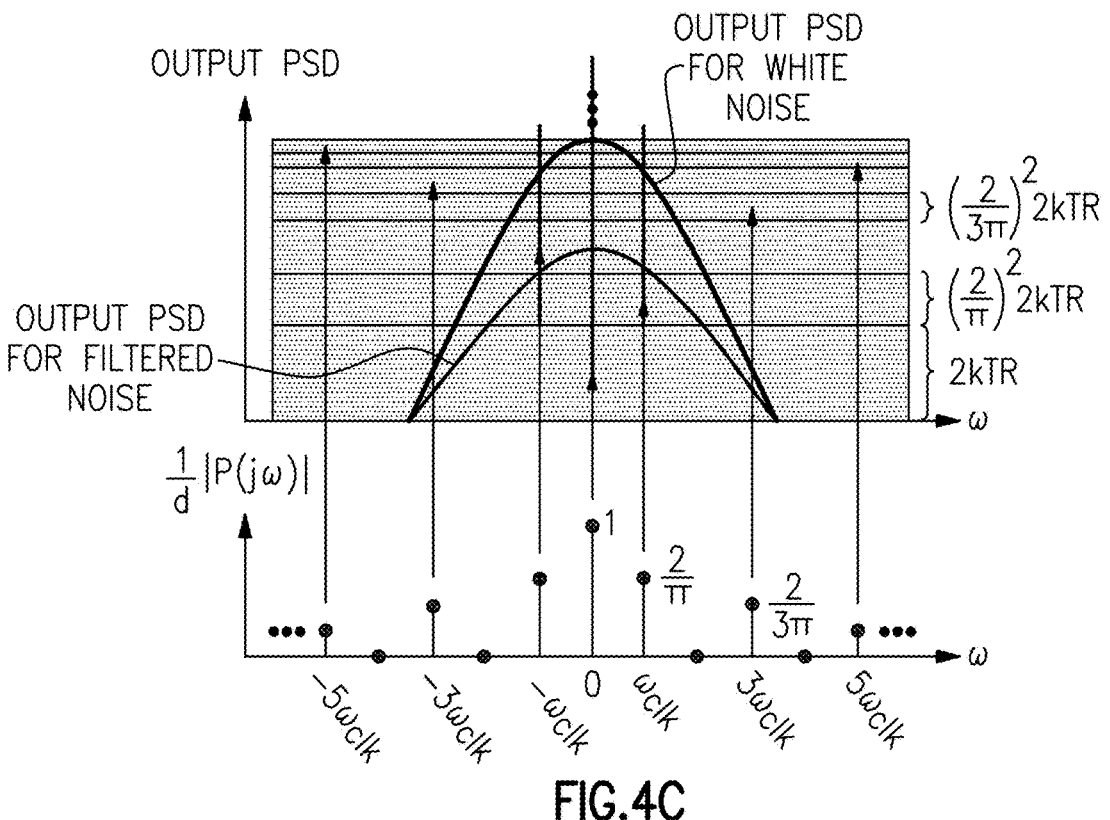
FIG. 4C is a graph of one example of output PSD for the noise circuit model of FIG. 4A.

FIG. 4A is a schematic diagram of another embodiment of a noise circuit model 60 for a demodulation circuit for a gyroscope. FIG. 4B is a graph of one example of input PSD for the noise circuit model 60 of FIG. 4A. FIG. 4C is a graph of one example of output PSD for the noise circuit model 60 of FIG. 4A.

The noise circuit model 60 of FIG. 4A is similar to the noise circuit model 50 of FIG. 3A, except that the noise circuit model 60 of FIG. 4A further includes an amplifier noise voltage source 41, an amplifier resistor 38, an amplifier 36, a highpass filter capacitor 37, a highpass filter resistor 39, and a switch noise voltage source 42.

In comparison to FIG. 3B in which the input noise is white, the noise in FIG. 4B is filtered by highpass and lowpass using the depicted components in FIG. 4A. Thus, the output PSD shown in FIG. 4C is lower as compared to the depicted reference for white noise.

Thus, at the cost of additional resistor-capacitor (RC) components, the folded noise can be further lowered by adding a high pass filter together with a low pass filter.

Figure 5:
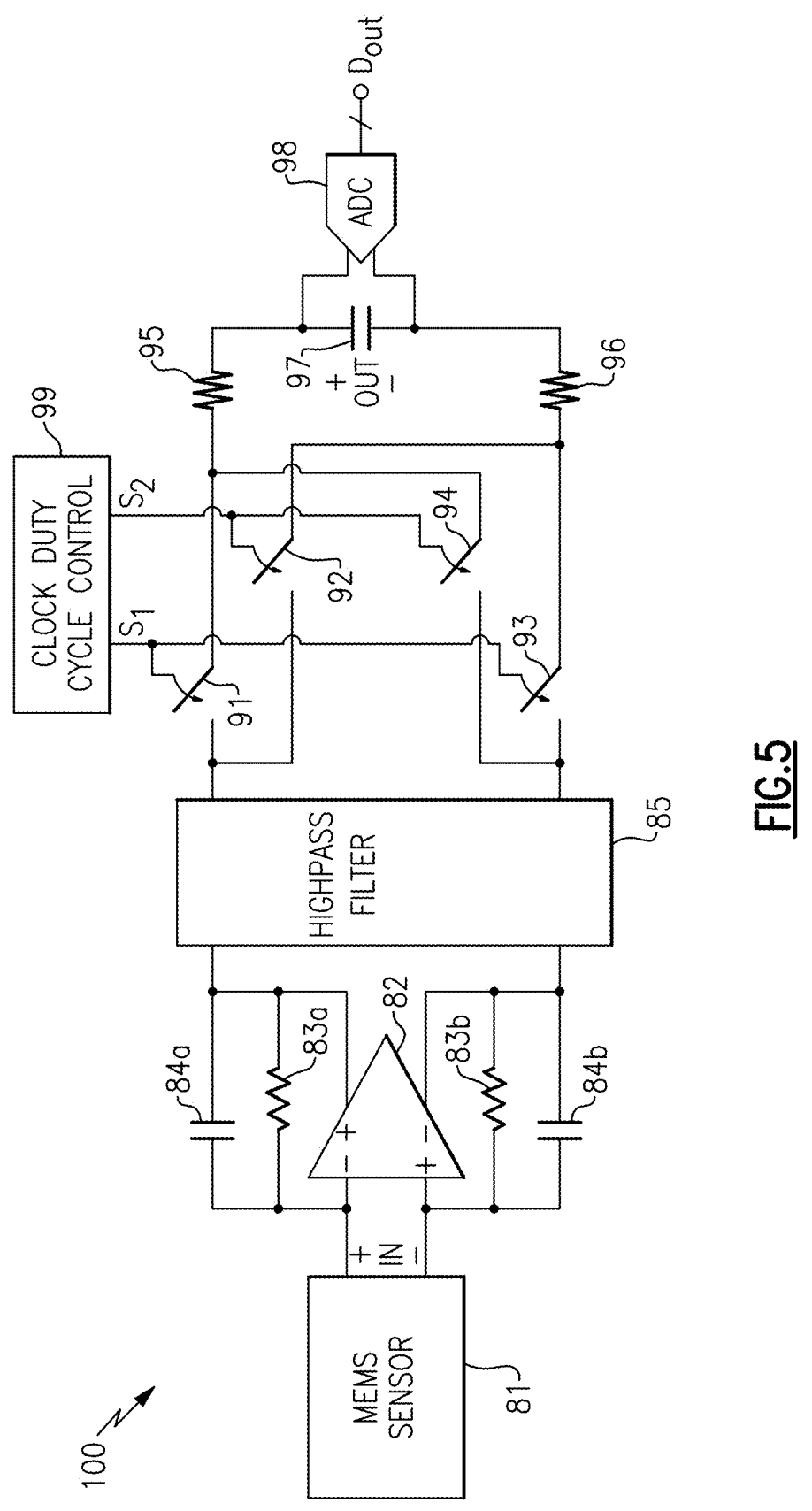
FIG. 5 is a schematic diagram of one embodiment of a demodulation system for a gyroscope.

FIG. 5 is a schematic diagram of one embodiment of a demodulation system 100 for a gyroscope.

The demodulation system 100 includes a microelectromechanical sensor 81, a fully differential amplifier 82, a first feedback resistor 83a, a second feedback resistor 83b, a first feedback capacitor 84a, a second feedback capacitor 84b, a highpass filter 85, a first switch 91, a second switch 92, a third switch 93, a fourth switch 94, a first low pass filtering resistor 95, a second low pass filtering resistor 96, an output capacitor 97, an analog-to-digital converter (ADC) 98, and a clock duty cycle control circuit 99. The demodulation system 100 can be formed on a common die to aid in enhancing integration, improving performance, and/or reducing noise.

In the illustrated embodiment, the microelectromechanical sensor 81 outputs a differential AM gyroscope signal (IN) that is provided differentially between a first input and a second input of the differential amplifier 82. The microelectromechanical sensor 81 can be implemented in a wide variety of ways including, but not limited to, using the configuration shown in FIG. 1A.

As shown in FIG. 5, the first feedback resistor 83a and the first feedback capacitor 84a are connected in parallel between a first output of the differential amplifier 82 and the first input of the differential amplifier 82. Additionally, the second feedback resistor 83b and the second feedback capacitor 84b are connected in parallel between a second output of the differential amplifier 82 and the second input of the differential amplifier 82.

The highpass filter 85 receives an amplified gyroscope signal from the outputs of the differential amplifier 82, and highpass filters the amplified gyroscope signal to generate a highpass filtered gyroscope signal. The highpass filter 85 can be implemented in a variety of ways including, but not limited to, using series capacitors and shunt resistors (for example, using a configuration like that shown in FIG. 4A).

The first switch 91 is connected between a first output of the highpass filter 85 and a first end of the first low pass filtering resistor 95 and is controlled by a first switch control signal $S_1$ from the clock duty cycle control circuit 99. Additionally, the second switch 92 is connected between the first output of the highpass filter 85 and a first end of the second low pass filtering resistor 96 and is controlled by a second switch control signal $S_2$ from the clock duty cycle control circuit 99. Additionally, the third switch 93 is connected between a second output of the highpass filter 85 and the first end of the second low pass filtering resistor 96 and is controlled by the first switch control signal $S_1$. Furthermore, the fourth switch 94 is connected between the second output of the highpass filter 85 and the first end of the first low pass filtering resistor 95 and is controlled by the second switch control signal $S_2$ from the clock duty cycle control circuit 99.

With continuing with reference to FIG. 5, the output capacitor 97 is connected between a second end of the first low pass filtering resistor 95 and a second end of the second low pass filtering resistor 96. The voltage across the output capacitor 97 corresponds to a demodulated gyroscope signal OUT. The ADC 98 digitizes the demodulated gyroscope signal OUT to generate a multi-bit digital output signal $D_{OUT}$.

The clock duty cycle control circuit 99 controls a duty cycle of the first switch control signal $S_1$ and the second switch control signal $S_2$ to achieve a desired trade-off between settling time and noise. For example, the duty cycle can be selected to achieve a desired N.A.F. In certain implementations, the clock duty cycle control circuit 99 controls the duty cycle d to be ¼ or less, or more particularly, 1/16 or less.

Conclusion

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A demodulation circuit for a gyroscope, the demodulation circuit comprising:
   a plurality of switches configured to receive an amplitude modulated (AM) gyroscope signal;
   an output capacitor coupled to the plurality of switches, wherein the output capacitor is configured to output a demodulated gyroscope signal; and
   a clock duty cycle control circuit configured to control a duty cycle of the plurality of switches, the plurality of switches comprising a first switch connected between a first input node and a first output node and controlled by a first switch control signal from the clock duty cycle control circuit, a second switch connected between the first input node and a second output node and controlled by a second switch control signal from the clock duty cycle control circuit, a third switch connected between a second input node and the second output node and controlled by the first switch control signal, and a fourth switch connected between the second input node and the first output node and controlled by the second switch control signal.

2. The demodulation circuit of claim 1, further comprising a high pass filter configured to filter the AM gyroscope signal prior to being received by the plurality of switches.

3. The demodulation circuit of claim 2, further comprising an amplifier configured to amplify the AM gyroscope signal prior to being filtered by the high pass filter.

4. The demodulation circuit of claim 1, further comprising a low pass filter configured to filter the demodulated gyroscope signal, wherein the low pass filter comprises the output capacitor and a resistor connected between the output capacitor and the plurality of switches.

5. The demodulation circuit of claim 1, wherein the clock duty cycle control circuit is configured to control a duty cycle of the first switch control signal and a duty cycle of the second switch control signal to be less than or equal to one quarter.

6. The demodulation circuit of claim 1, wherein a first end of the output capacitor is directly connected to the first output node, and a second end of the output capacitor is directly connected to the second output node.

7. The demodulation circuit of claim 1, further comprising a first low pass filtering resistor connected between a first end of the output capacitor and the first output node, and a second low pass filtering resistor connected between a second end of the output capacitor and the second output node.

8. A method of signal demodulation for a gyroscope, the method comprising:
   receiving an amplitude modulated (AM) gyroscope signal as an input to a plurality of switches;
   outputting a demodulated gyroscope signal from an output capacitor coupled to the plurality of switches; and
   controlling a duty cycle of the plurality of switches using a clock duty cycle control circuit, the plurality of switches comprising a first switch connected between a first input node and a first output node and controlled by a first switch control signal from the clock duty cycle control circuit, a second switch connected between the first input node and a second output node and controlled by a second switch control signal from the clock duty cycle control circuit, a third switch connected between a second input node and the second output node and controlled by the first switch control signal, and a fourth switch connected between the second input node and the first output node and controlled by the second switch control signal.

9. The method of claim 8, further comprising filtering the AM gyroscope signal prior to being received by the plurality of switches using a high pass filter.

10. The method of claim 9, further comprising amplifying the AM gyroscope signal prior to being filtered by the high pass filter using an amplifier.

11. A gyroscope demodulation system comprising:
   a microelectromechanical sensor configured to output an amplitude modulated (AM) gyroscope signal; and
   a demodulation circuit comprising:
      a plurality of switches configured to receive the AM gyroscope signal;
      an output capacitor coupled to the plurality of switches, wherein the output capacitor is configured to output a demodulated gyroscope signal; and
      a clock duty cycle control circuit configured to control a duty cycle of the plurality of switches, the plurality of switches comprising a first switch connected between a first input node and a first output node and controlled by a first switch control signal from the clock duty cycle control circuit, a second switch connected between the first input node and a second output node and controlled by a second switch control signal from the clock duty cycle control circuit, a third switch connected between a second input node and the second output node and controlled by the first switch control signal, and a fourth switch connected between the second input node and the first output node and controlled by the second switch control signal.

12. The gyroscope demodulation system of claim 11, further comprising an analog-to-digital converter (ADC) configured to generate a multi-bit digital output signal based on digitizing the demodulated gyroscope signal.

13. The gyroscope demodulation system of claim 11, wherein the demodulation circuit further comprises a high pass filter configured to filter the AM gyroscope signal prior to being received by the plurality of switches.

14. The gyroscope demodulation system of claim 13, wherein the demodulation circuit further comprises an amplifier configured to amplify the AM gyroscope signal prior to being filtered by the high pass filter.

15. The gyroscope demodulation system of claim 11, wherein the demodulation circuit further comprises a low pass filter configured to filter the demodulated gyroscope signal, wherein the low pass filter comprises the output capacitor and a resistor connected between the output capacitor and the plurality of switches.

16. The gyroscope demodulation system of claim 11, wherein a signal path from an output of the microelectromechanical sensor to the output capacitor is fully differential.

17. The gyroscope demodulation system of claim 11, wherein a first end of the output capacitor is directly connected to the first output node, and a second end of the output capacitor is directly connected to the second output node.

18. The gyroscope demodulation system of claim 11, further comprising a first low pass filtering resistor connected between a first end of the output capacitor and the first output node, and a second low pass filtering resistor connected between a second end of the output capacitor and the second output node.

19. The method of claim 8, further comprising using the clock duty cycle control circuit to control a duty cycle of the first switch control signal and a duty cycle of the second switch control signal to be less than or equal to one quarter.

20. The method of claim 8, further comprising providing low pass filtering using a first low pass filtering resistor connected between a first end of the output capacitor and the first output node, and using a second low pass filtering resistor connected between a second end of the output capacitor and the second output node.

* * * * *